US008749161B2

(12) United States Patent
Nerone et al.

(10) Patent No.: US 8,749,161 B2
(45) Date of Patent: Jun. 10, 2014

(54) COMPACT FLUORESCENT LAMP AND LED LIGHT SOURCE WITH ELECTRONIC COMPONENTS IN BASE

(75) Inventors: Louis Robert Nerone, Brecksville, OH (US); Virgil A. Chichernea, Mentor, OH (US); David Joseph Kachmarik, Strongsville, OH (US); Himamshu Prasad, Koromangala (IN)

(73) Assignee: General Electric Company, Schenectady, NY (US)

( * ) Notice: Subject to any disclaimer, the term of this patent is extended or adjusted under 35 U.S.C. 154(b) by 847 days.

(21) Appl. No.: 12/914,116

(22) Filed: Oct. 28, 2010

(65) Prior Publication Data

US 2012/0104947 A1    May 3, 2012

(51) Int. Cl.
*H05B 37/02* (2006.01)
(52) U.S. Cl.
USPC ............... 315/291; 315/DIG. 7; 315/DIG. 5; 313/318.08
(58) Field of Classification Search
USPC ........... 313/318.08; 315/291, DIG. 7, DIG. 5; 362/260
See application file for complete search history.

(56) References Cited

U.S. PATENT DOCUMENTS

| | | | |
|---|---|---|---|
| 5,691,606 A | 11/1997 | Moisin et al. | |
| 5,955,841 A | 9/1999 | Moisin et al. | |
| 6,443,769 B1 * | 9/2002 | Nerone et al. | 439/612 |
| 6,909,246 B2 * | 6/2005 | Hein | 315/248 |
| 7,210,818 B2 * | 5/2007 | Luk et al. | 362/231 |
| 7,956,550 B2 * | 6/2011 | Nerone | 315/287 |
| 2007/0018587 A1 * | 1/2007 | Nicolai | 315/127 |
| 2008/0067944 A1 * | 3/2008 | Wang et al. | 315/185 R |
| 2010/0176728 A1 * | 7/2010 | Kloss et al. | 315/56 |
| 2011/0089832 A1 * | 4/2011 | Kelly | 315/56 |

OTHER PUBLICATIONS

"Nanocrystalline vitroperm emc components", Vacuumschmelze GMBH 2004.
Ferroxcube, "Data sheet", Sep. 1, 2008.
Magnetics, specification for 0J42616UG.
F. Roozeboon, A.L.A.M. Kemmeren, J.F.C. Verhoeven, F.C. Van Den Heuvel, J. Klootwiij, H. Kretschman, T. Fric, E.C.E. Van Grunsven, S. Brady, C. Bunel, D. Chevrie, F. Lecornec, S. Ledain, F. Murray, P. Philippe, "Passive and heterogeneous integration towards a Si-based system-in-package concept", Elsevier 2005.
Frank Murray, Francois Lecornec, Serge Bardy, Catherine Bunel, Jan Verhoeven, Eric Van Den Heuvel, Johan Klootwijk, and Fred Roozeboom, "Silicon-based system-in-package: breakthroughs in miniaturization and 'nano'-integration supported by very high quality passives and system level design tools".

* cited by examiner

*Primary Examiner* — Douglas W Owens
*Assistant Examiner* — Borna Alaeddini
(74) *Attorney, Agent, or Firm* — Fay Sharpe LLP (57) ABSTRACT

Light sources are presented in which lamp ballast or LED driver circuitry is disposed within a base assembly using integrated boards with components embedded between board layers and/or circular flex boards with pot core magnetic components and/or ASICs and thermally conductive board core materials with thermal vias, reflective mirrors, and/or potting materials to conduct heat out through the base to facilitate reduced form factors for lamps and/or LED light sources.

39 Claims, 10 Drawing Sheets

COMPACT FLUORESCENT LAMP AND LED LIGHT SOURCE WITH ELECTRONIC COMPONENTS IN BASE

BACKGROUND OF THE DISCLOSURE

Figure 16:
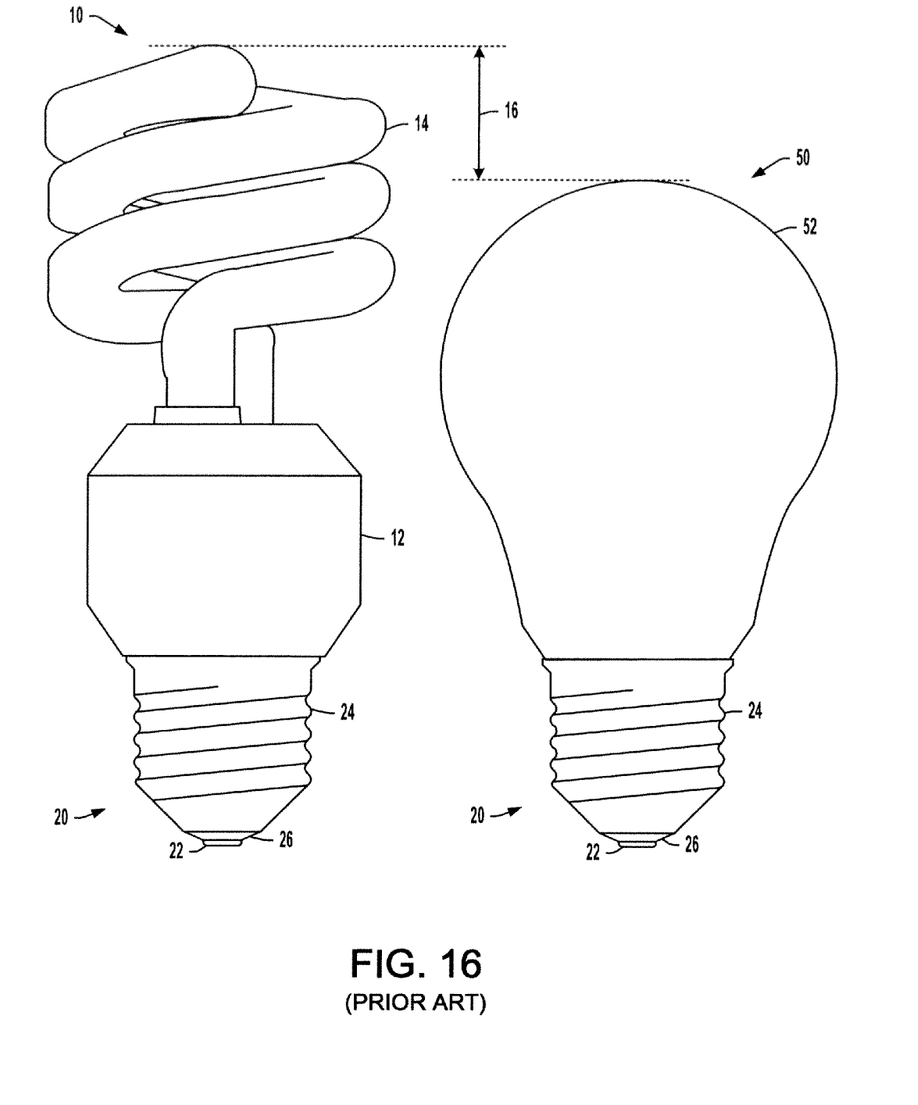
FIG. 16 is a side elevation view illustrating conventional CFL and incandescent bulbs.

Many conventional incandescent light bulbs utilize a so-called Edison base or cap. FIG. 16 shows a conventional light bulb 50 with an Edison base 20 having a conductive metal structure 24 with an upper portion of generally cylindrical shape that tapers to a bottom portion having a contact tip 22 and an insulative intermediate structure 26. A Tungsten filament (not shown) is mounted within a glass bulb 52 that is attached to the Edison base 20, with first and second wires (not shown) connected from the filament to the threaded structure 24 and to the tip contact 22, respectively. In use, the bulb assembly 50 is screwed into a corresponding socket of a light fixture (not shown) in which the contact 22 is electrically connected with a first power line and the threaded conductor 24 engages with conductive mating threads for electrical connection to a second power line. The socket provides AC current to the filament through these connections to cause light emission from the filament. Other popular lamp base styles include bayonet bases with two lug contacts extending outwardly from the cylindrical base structure for push and twist connection to a socket with corresponding L-shaped slots, as well as bases having two pin or lug type contacts extending from the bottom of the base or cap. Each lamp base or cap type typically comes in a variety of sizes and are commonly designated by a diameter dimension such as 27 mm Edison types (E27), 22 mm Bayonet types (B22), etc.

In recent years, the inefficiencies of conventional incandescent bulbs 50 has lead to development of compact fluorescent lamps (CFLs), halogen lamps, LED array lighting devices, and other more efficient forms of light sources. FIG. 16 shows a CFL 10 with a fluorescent lamp structure 14 mounted to an Edison base 20 via an intermediate housing 12 which includes power conversion circuitry, such as a rectifier, DC-DC converter, and an inverter to provide high frequency AC power to the lamp 14. Replacement of incandescent light bulbs 50 with CFLs or LED light sources in existing fixtures can reduce electrical energy consumption, where the provision of an Edison base 20 in such replacement CFLs 10 allows simple changeout of incandescent bulbs 50 with a CFL 10 without having to install a different fixture socket. However, the replacement CFL 10 is typically taller than the bulb 50 it is replacing. For example, FIG. 16 shows a typical height difference 16, with the CFL device 10 being approximately 20% taller than the incandescent bulb 10. This physical size difference creates compatibility issues with the type and size of fixtures where CFLs and other replacement light sources can be used.

SUMMARY OF THE DISCLOSURE

A light source is provided having one or more light emitting elements, such as LEDs, HID lamps, compact fluorescent lamps, halogen lamps, etc., as well as a base assembly such as an Edison base, bayonet base, or other known lamp base or cap type with a base structure and a ballast or driver. The base structure has a generally cylindrical first portion with first and second contacts, such as an Edison type with a threaded outer surface forming a first electrically conductive contact to engage a threaded socket, as well as a second electrically conductive contact separated from the first contact by an insulator. The ballast or driver includes a circuit board assembly located wholly or partially within the base structure interior, which has multiple layers with one or more embedded electrical components such as resistors, capacitors, and/or inductors formed between adjacent layers.

In certain embodiments, the board assembly is located entirely within the base interior, and the board in certain implementations has a circular outer surface extending to or near the inner surface of the threaded first portion of the base. In other embodiments, the board may extend into the lower tapered portion of the base.

In certain embodiments, potting material is formed around at least a portion of the circuit board assembly in the interior of the base structure.

A mirror is provided in certain embodiments between the light emitting element and the ballast or driver, which includes a reflective surface facing the light emitting element.

In certain embodiments, the circuit board assembly includes a thermally conductive core layer to conduct heat toward the inner surface of the first portion of the base structure. In some embodiments, the board includes thermal via structures extending through one or more board layers to the core layer in order to conduct heat toward the core layer.

In certain embodiments, one or more application specific integrated circuits (ASICs) are mounted to an outer layer of the circuit board assembly.

In certain embodiments, moreover, pot core magnetic components are used in the ballast or driver circuits, and are located at least partially within the Edison based interior.

In certain embodiments, the ballast or driver includes a flex board formed into a cylinder shape with an outer surface at or near the inner surface of the first portion of the base structure. The flex board in certain embodiments extends through substantially 360 degrees, and in other embodiments a partial cylinder is formed with the flex board extending to an angle less than 360 degrees and more than 180 degrees.

BRIEF DESCRIPTION OF THE DRAWINGS

One or more exemplary embodiments are set forth in the following detailed description and the drawings, in which.

DETAILED DESCRIPTION OF THE PREFERRED EMBODIMENT

Referring now to the drawings, where like reference numerals are used to refer to like elements throughout, and wherein the various features are not necessarily drawn to scale, the present disclosure facilitates incorporation of driver and/or ballast circuitry completely or partially into a base of a light source to facilitate the use of CFL, LEDs, halogen and other lighting technology for energy consumption reduction through replacement of existing incandescent light bulbs without fixture modification. Thusfar, incorporation of driver/ballast components in a base has been hindered by thermal and packaging issues that impact product lifetime, performance, and reliability.

The disclosure may be advantageously employed to reduce component temperature by increasing thermal transfer away from the electronics to mitigate the impact of the heat generated by the light source. Although illustrated and described below in the context of Edison base lamps, the disclosure is also applicable to other lamp base types and styles. As shown generally in FIGS. 1A-15, lamp ballast or LED driver circuitry is completely or partially located inside an Edison base assembly 120 using integrated boards 200 with components 211 embedded between board layers 212 (FIGS. 1A-8) and/or circular flex boards 200f (FIGS. 9-15) with pot core magnetic components 500 (FIGS. 6-15) and/or ASICs 220 (FIGS. 1A-5 and 8-15) and thermally conductive board core materials 210 with thermal vias (FIG. 2A), reflective mirrors 300 (FIGS. 3, 5, 7, and 15), and/or potting materials 400 (FIGS. 4, 5, 7, 8, 14, and 15) to conduct heat out through the Edison base 124 to facilitate reduced form factors for lamps and/or LED light sources. Alone or in combination, these techniques and features improve the capability to use hot light emitting devices without adversely impacting the reliability, lifetime, and performance of the associated driver/ballast circuits. These techniques, moreover, can be used in combination with or independent of other possible approaches such as heat spreading using the surface area of a circuit board assembly, attaching heat sinks to heat generating components, and the use of heat shields to separate hot and cold elements of a ballast or driver.

As exemplified in the illustrated embodiments, the disclosure employs integrated boards having embedded capacitors, resistors, and/or inductors 211 integrated in one or more multilayer board assemblies 200. Directly embedding such components 211C, 211R, 211L into the circuit board 200 reduces thermal resistance between key components. The board assemblies 200 may be round with surface mount technology (SMT) components on one or both outer (top or bottom) layers 212t, 212b (FIG. 2A), respectively. In some embodiments, power magnetic and/or EMI inductors of input filter stages, DC-DC converter circuits, and/or inverter circuits can be implemented as pot core magnetic components with a cylindrical package that can be fully inserted in the Edison base 120. The board itself can be made with a thermally conductive core layer 210 (FIG. 2A) for improved heat transfer to the screw base 124 with thermal vias TV (FIG. 2A) in the board 200.

Figures 1A, 1B:
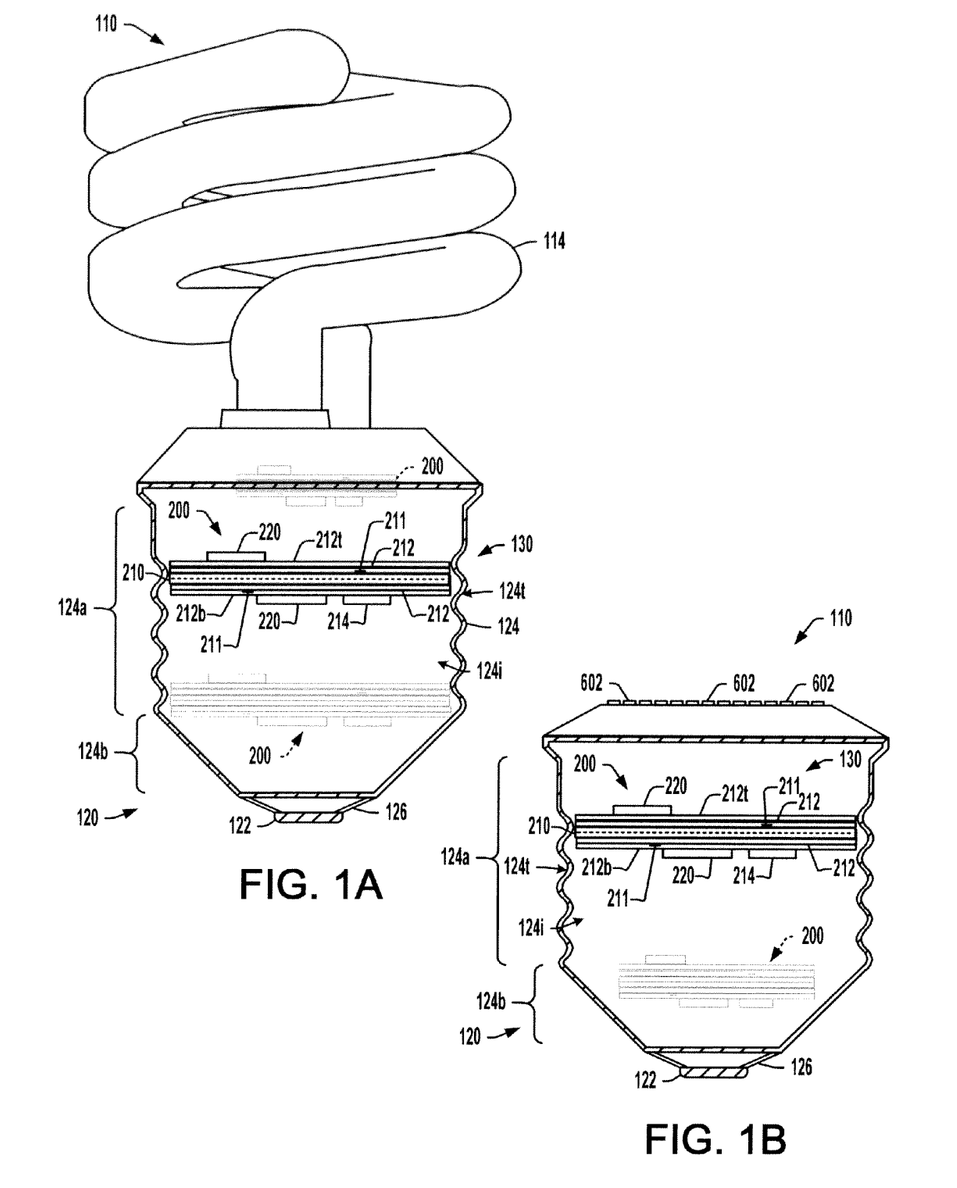
FIG. 1A is a partial sectional side elevation view illustrating an exemplary compact fluorescent lamp (CFL) including a ballast circuit board located inside an Edison base structure and including embedded electrical components in accordance with one or more aspects of the present disclosure.
FIG. 1B is a partial sectional side elevation view illustrating an exemplary LED-type light source having a driver circuit board with embedded components inside an Edison base structure.

The disclosed techniques can be used in connection with CFLs, LEDs, Halogen lamps, and other light source types to facilitate replacement for improved energy efficiency while adapting the need for driver or ballast circuitry to size and/or shape restrictions associated with existing lighting fixtures having female threaded lamp sockets adapted for standard Edison base interfacing. FIGS. 1A and 1B respectively illustrate exemplary compact fluorescent lamp (CFL) and light emitting diode (LED) type light sources 110 in which a light emitting element such as a lamp 114 or LED 602 (or arrays thereof) is supported for illumination with all or a portion of the ballast or driver components and circuitry located in an Edison base assembly 120. As seen in FIG. 1A, the height of the disclosed CFL device 110 is roughly equivalent to that of a regular incandescent (e.g., A21) lamp.

The base assembly 120 includes a base structure 124 defining an interior 124i, with a generally cylindrical first portion 124a having a threaded outer surface 124t forming a first electrically conductive contact to engage a threaded socket (socket not shown). A second tapered portion 124b extends down and inward from the cylindrical portion 124a to an insulator ring structure 126 that surrounds a second electrically conductive contact 122. The devices 110 in FIGS. 1A and 1B include a ballast 130 (FIG. 1A for CFL 114) or a driver 130 (for powering the array of LEDs 602 in FIG. 1B). The ballast or driver 130 selectively converts power received from the threaded socket to provide power to the at least one light emitting element 114, 602.

Figure 2A:
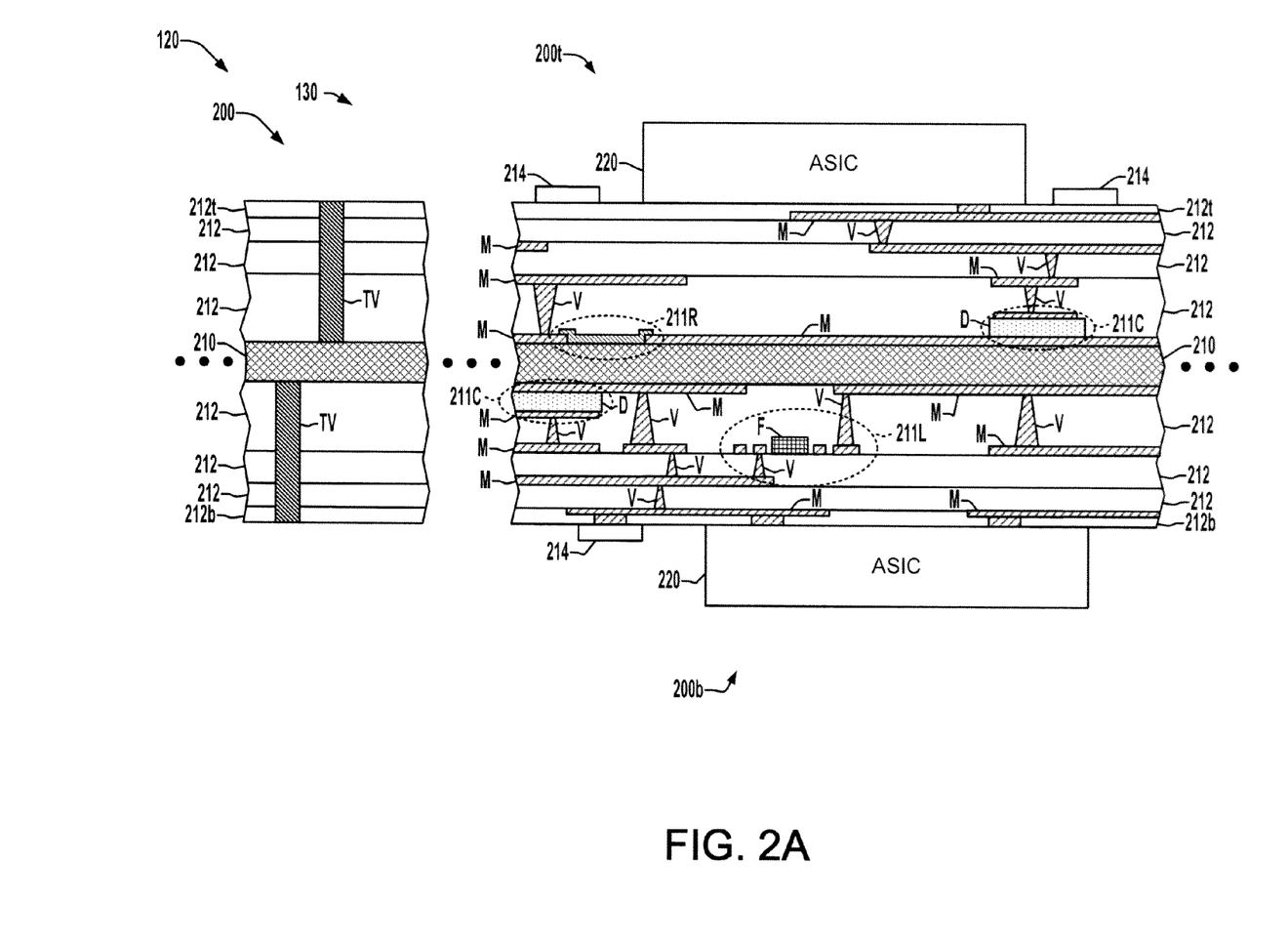
FIG. 2A is a partial fragmentary side elevation view in section illustrating exemplary portions of a ballast or driver circuit board assembly in the light sources of FIGS. 1A and 1B including multiple layers with resistors, capacitors, and inductor circuit components formed between layers in a multi-layer board assembly structure.

Referring to FIGS. 1A and 2A, the ballast/driver 130 includes at least one circuit board assembly 200 located at least partially within the interior 124i of the base structure 124. The board 200 includes multiple layers 210, 211 with a top layer 212t, one or more intermediate layers 212, a bottom layer 212b, and a core layer 210 may of a thermally conductive material, such as FR4 to conduct heat laterally outward toward the inner surface of the first portion 124a of the base structure 124. The board assembly 200 also includes one or more embedded electrical components 211 formed between adjacent layers 210, 211 of the circuit board assembly 200. As seen in FIG. 2A, the embedded components 211 can be one or more of embedded resistors 211R, embedded capacitors 211C, and/or embedded inductors 211L. In the illustrated example, the board assembly 200 includes one or more conductive routing features within a given layer or layer boundary, such as metal (e.g., copper, etc.) features, traces, etc., designated "M" in FIG. 2A. The board layers 210, 212 are otherwise generally electrically insulative, with one or more electrically conductive (e.g., metal) vias V extending through certain layers. As seen in FIG. 2A, moreover, the upper and/or lower layers 212t, 212b, may include metallic or other conductive contacts for interfacing to surface mount components 214 and/or to ASICs 220. For example, passive ASIC s 220 may be provided for transformers, inductors, capacitors or combinations thereof in the ballast/driver circuitry 130. In certain embodiments, moreover, one or more active ASICs 220 may be used, where the use of such active and/or passive ASICs 220 can advantageously decrease the package size of the ballast/driver 130.

The illustrated circuit board assembly 200, moreover, includes thermal via structures TV extending through at least one of the layers 212 to the core layer 210 to conduct heat toward the core layer 210. In certain embodiments, such as those of FIGS. 1A and 1B, the circuit board assembly 200 is round to maximize the top and bottom board surface area for thermal efficiency, and includes a circular outer surface proximate or touching an inner surface of the first portion 124a of the base structure 124. This advantageously facilitates transfer of heat from the board 200 to the Edison base 124. In certain embodiments, potting materials 400 (FIGS. 4, 5, 7, 8, 14, and 15) are provided around all or portions of the board 200, where the potting material 400 can be thermally conductive to help conduct heat out through the Edison base 124. As seen in FIGS. 1A and 1B, moreover, more than one board laterally extending assembly 200 may be provided at any suitable depth (e.g., vertical location) wholly or partially within the interior of the Edison base assembly 120, which may be within the first and/or second portions 124a, 124b, and/or which may extend above the first portion 124a (e.g., FIG. 1A). It is noted that embodiments that incorporate the ballast/driver 130 within the Edison base facilitate reduction in the finished product height and thereby make the light source more amenable to replacement of a larger number of incandescent bulbs.

An embedded resistor 211R in one embodiment is constructed as a laser trimmed conductive (e.g., metal) feature with a feature width trimmed in a controlled fashion to implement a desired resistance value (and current carrying capacity). An embedded capacitor 211C (two examples shown in FIG. 2A) is constructed by forming a conductive structure (e.g., lower or first plate) structure (including material deposition, masking, etching, etc.), over which is formed a dielectric material D. The dielectric D is then patterned, and an upper or second capacitor plate is formed by deposition and patterning of another conductive material (e.g., metal) above the upper surface of the dielectric D, with metal traces M and/or vias V connecting electrically to the capacitor plates according to the circuit design of the ballast/driver 130. As further shown in FIG. 2A, an embedded inductor 211L in one example is created by forming (e.g., deposition and lithographic patterning) a ferrous core material F on or in one of the interior layers 212, with traces being formed in a single layer as shown (or in multiple layers) to wholly or at least partially encircle the core F (thereby forming one or more winding turns or partial turns) to form an inductance, with suitable conductive connections (e.g., metal features M and/or vias V) to the winding(s) in one or more layers. While the exemplary inductor 211L involves winding features formed laterally around the core F, other constructions are possible with metal features M combined with vias V forming vertically encircling windings "wound" around a formed core feature F.

Figure 2B:
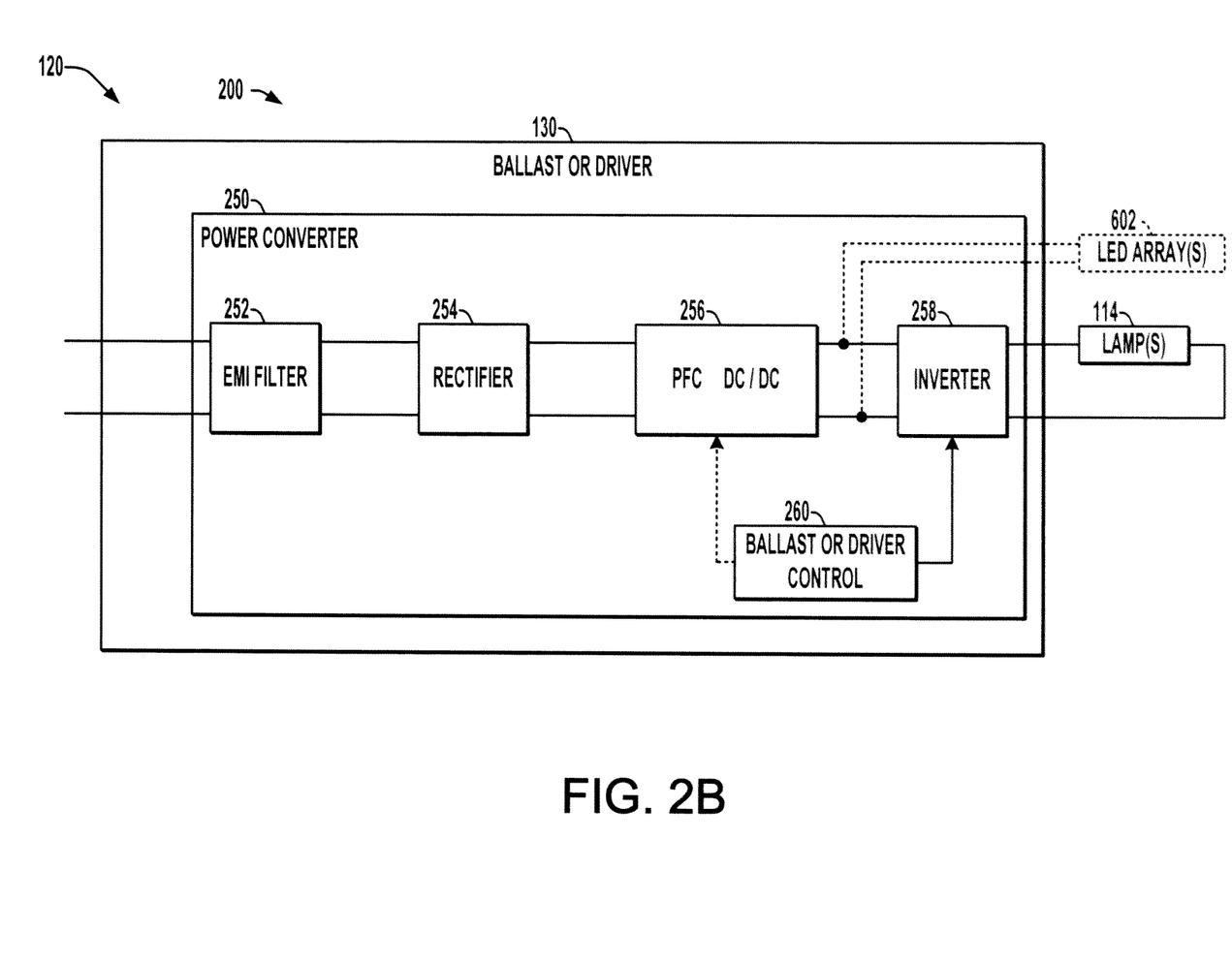
FIG. 2B is a schematic diagram illustrating circuitry of an exemplary ballast or LED driver in the light sources of FIGS. 1A and 1B.

Referring also to FIG. 2B, an exemplary ballast or driver circuit 200 is shown including a power conversion system 250 coupled with the power connections established by the threaded cap and the tip contact of the base 120, as well as a power conversion controller 260. The device 200 in certain embodiments is a ballast with the power conversion system 250 having a rectifier 254 receiving AC input power through an optional EMI filter 252 and providing an initial DC output to a power factor correcting (PFC) DC to DC converter 256. The converter 256 provides a DC output to an inverter 258, which converts the DC to provide AC output power to one or more lamps 250, such as fluorescent or HID lamp devices or halogen lamps. In other embodiments, the apparatus 200 is an LED driver and the power conversion system 250 need not include the inverter 258. In this case, the DC to DC converter 256 provides DC output power to drive one or more LED arrays 250. In both situations, a controller 260 is provided to regulate the output power by controlling one or both of the DC to DC converter 256 and/or the inverter 258. The connection of the ballast/driver circuitry between multiple boards 200 between the board(s) 200 and the light emitting element(s) 114, 602 and between the board(s) 200 and the electrical power contacts of the Edison base can be made by any suitable technique and devices, including without limitation edge connectors, board mounted connectors, wires, etc.

Figure 3:
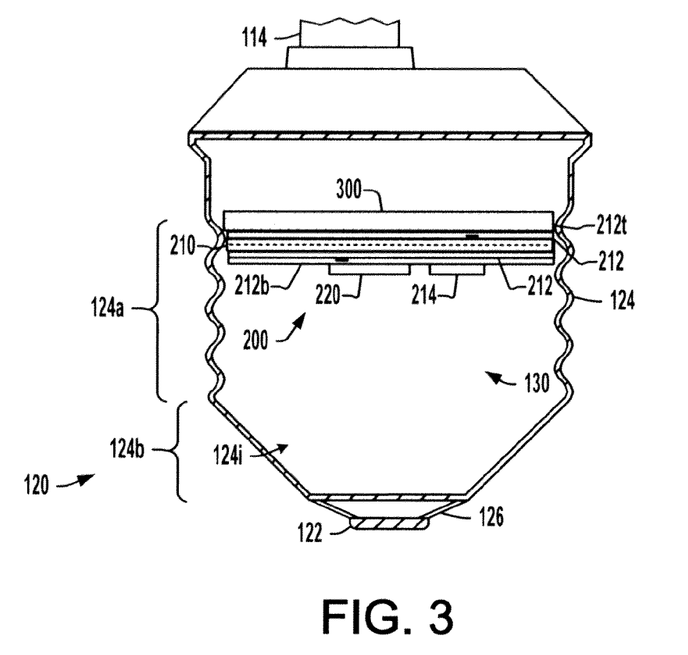
FIG. 3 is a partial side elevation view in section illustrating another exemplary light source with an Edison base having a mirror to reduce thermal effects of the light emitting lamp or LED on the ballast or driver circuitry.

FIG. 3 shows another possible embodiment in which a mirror 300 is located between the light emitting element 114, 602 and the ballast or driver 130. The mirror 300 includes a reflective surface at least partially facing upward toward the light emitting element 114, 602. The mirror 300 in certain embodiments can be mounted on the upper layer 212t of the board assembly 200.

Figure 4:
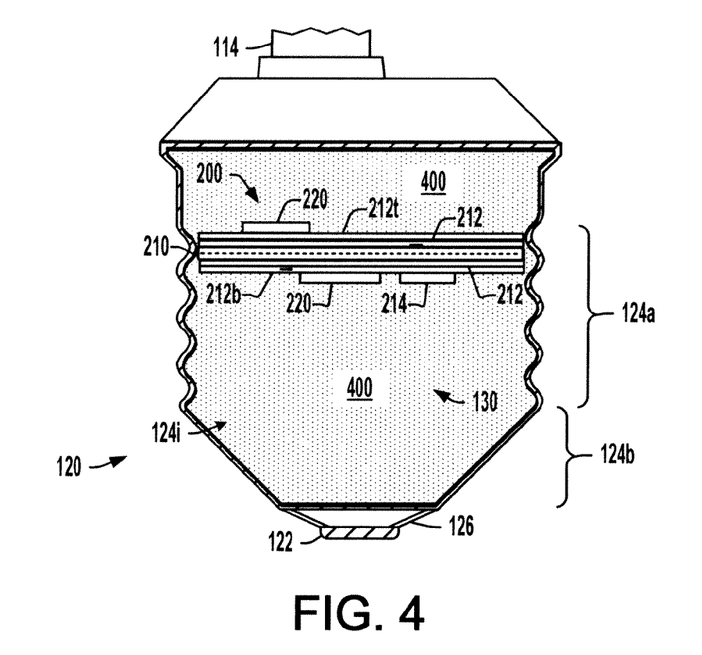
FIG. 4 is a partial side elevation view in section illustrating another exemplary light source with the interior of the Edison base substantially filled with potting material around the ballast or driver circuit board assembly.
Figure 5:
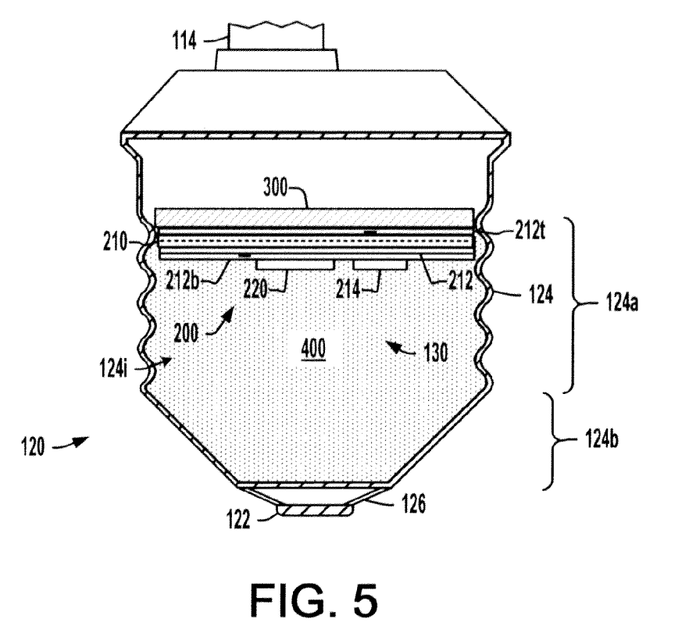
FIG. 5 is a partial side elevation view in section illustrating still another exemplary light source with the interior of the Edison base partially filled with potting material and with a mirror above the circuit board assembly.

Referring also to FIGS. 4 and 5, in certain embodiments, the Edison base assembly 120) includes potting material 400 formed around at least a portion of the circuit board assembly 200 in the interior 124i of the base structure 124. The example of FIG. 4 has the interior 124i of the Edison base 124 substantially tilled with potting material around the ballast or driver circuit board assembly 200. The example in FIG. 5 has an upwardly facing mirror 300 mounted to the top of the circuit board assembly 200 and provides potting material 400 partially filling the Edison base interior 124i below the level of the mirror 300.

Figure 6:
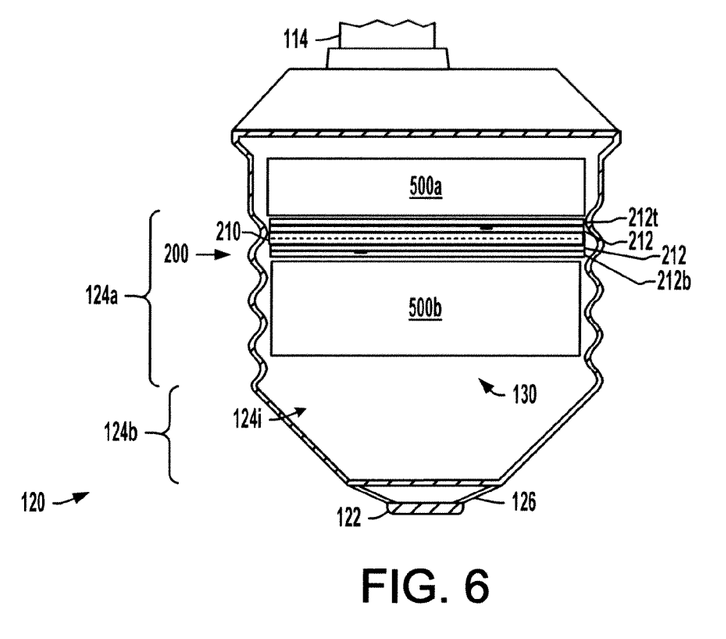
FIG. 6 is a partial side elevation view in section illustrating another exemplary light source including pot core magnetic components situated above and below the ballast or driver circuit board inside the Edison base.

As shown in FIGS. 6-15, the ballast or driver 130 in certain embodiments includes one or more pot core magnetic components 500 located in whole or in part within the interior 124i of the base structure 124. Suitable pot core magnetic components can include without limitation inductors, chokes, transformers or other components of the EMI filter circuit 252, the DC/DC converter circuit 256, and/or the inverter 258 of FIG. 2B, which are fabricated with windings would around cores such as VITROPERM 500F Fe-based nanocrystalline soft magnetic high tech material available from VAC Magnetics of Elizabethtown, Ky. or P11/7/I type cores available from Ferroxcube International Holding B.V., Roermond, the Netherlands. In the example of FIG. 6, one such pot core inductor 500a is situated above the board assembly 200, and may be mounted to the top layer 212t thereof in certain embodiments. This may be, for example, a filter inductor of the EMI filter stage 252 in FIG. 252, or may be a power inductor of the DC-DC converter 256 or the inverter 258 in certain embodiments. In the example of FIG. 6, a second pot core magnetic component 500b is located below the board assembly 200, and may (but need not) be mounted to the lower layer 212b of the board 200.

Figure 7:
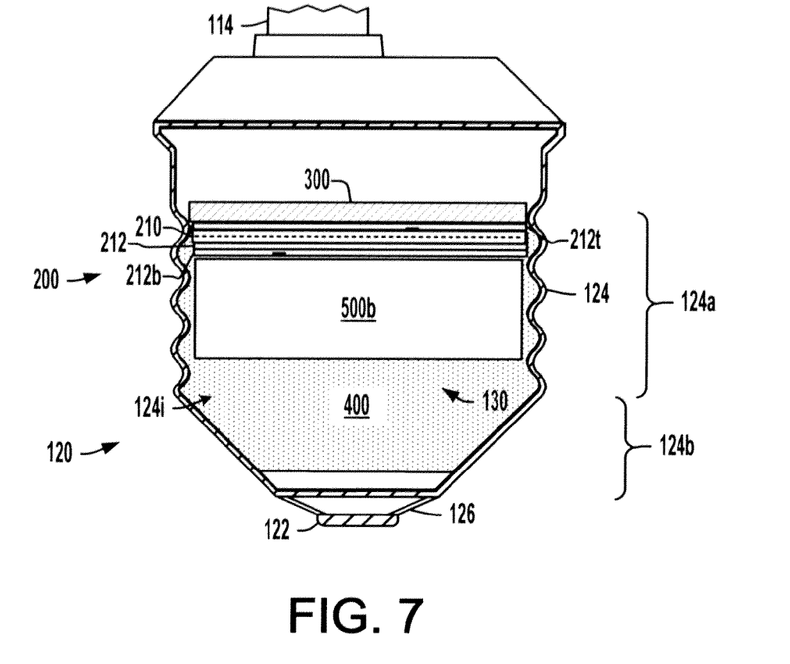
FIG. 7 is a partial side elevation view in section illustrating yet another exemplary light source including a pot core magnetic component below the circuit board assembly and a mirror above the circuit board assembly and potting material inside the Edison base.

FIG. 7 shows another embodiment including a pot core magnetic component 500b below the circuit board assembly 200 and a mirror 300 above the circuit board 200. In this example, potting material 400 is formed inside the Edison base 120 to just below the level of the mirror 300.

Figure 8:
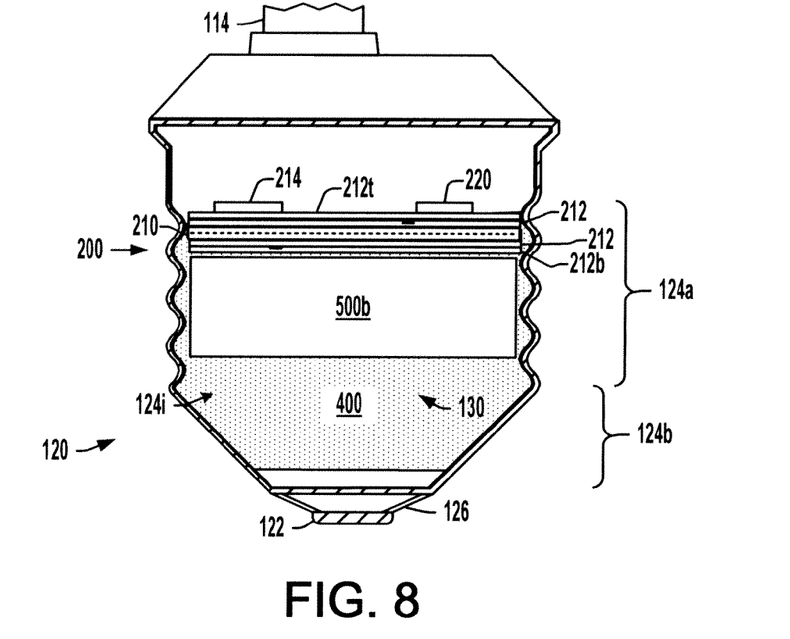
FIG. 8 is a partial side elevation view in section illustrating another exemplary light source with a pot core magnetic component below the circuit board assembly and with one or more ASICs on the top circuit board layer as well as potting material in the Edison base.

Another embodiment in FIG. 8 provides a pot core magnetic component 500b below the circuit board 200 with one or more ASICs 220 on the top circuit board layer 212t, along with potting material 400 in the Edison base interior 124i.

Figures 9, 10, 11:
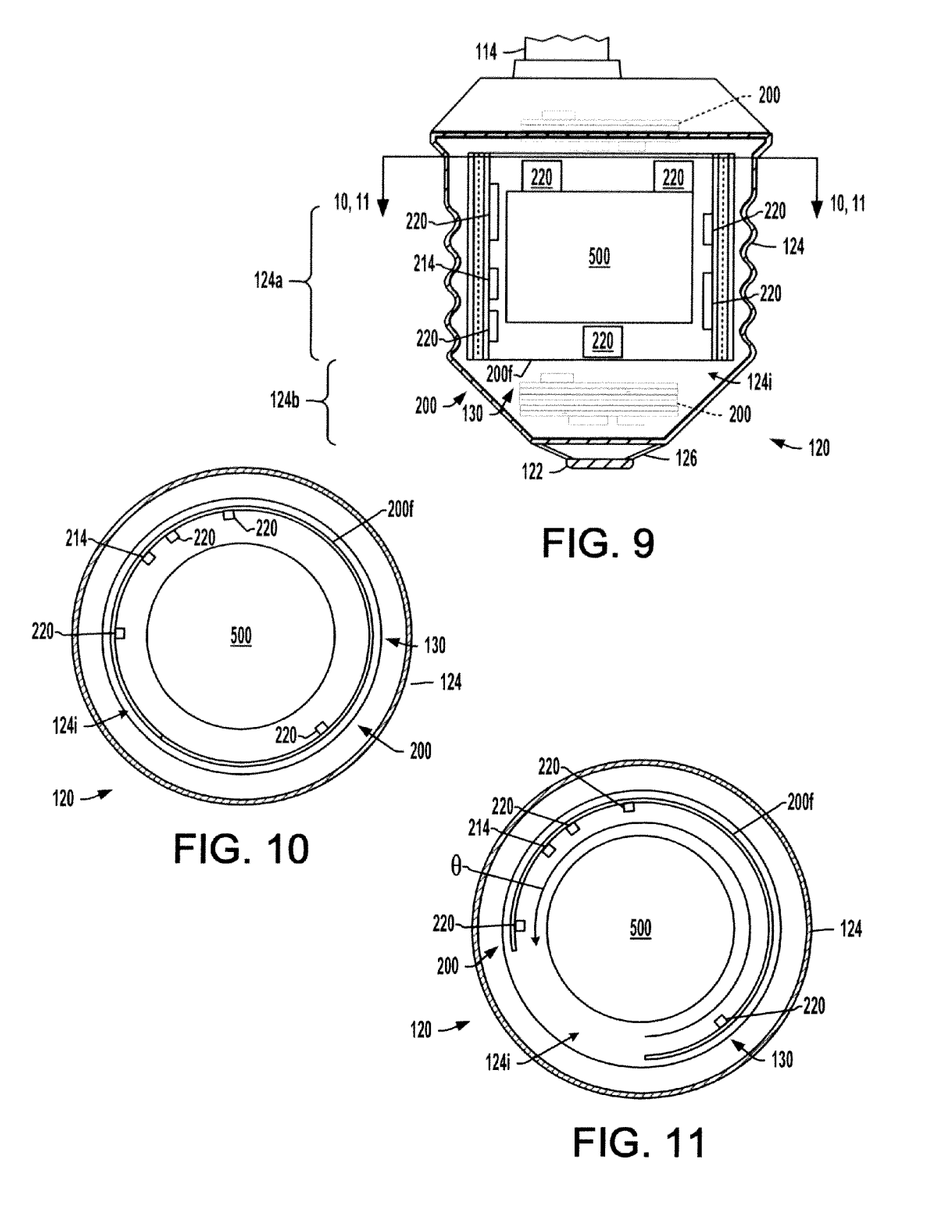
FIG. 9 is partial side elevation view in section illustrating an exemplary light source including a cylindrical flex board formed around all or a portion of the an inner Edison base surface with a pot core magnetic component in the center.
FIG. 10 is a partial top plan view in section taken along line 10-10 in FIG. 9 showing an embodiment in which the flex board extends through approximately 360 degrees near the inner wall of the Edison base.
FIG. 11 is a partial top plan view in section taken along line 11-11 in FIG. 9 showing another embodiment with a partially cylinder-shaped flex board extending through an angle θ of less than 360 degrees near the inner wall of the Edison base.

Referring to FIGS. 9-15, the ballast or driver 130 in certain embodiments includes a flex board 200f formed into a full or partial cylinder shape with an outer surface engaging or near the inner surface of the first portion 124a of the base structure 124. In this regard, flexible boards situated around all or portions of the Edison base inner wall(s) can be used with the SMT components 214 and/or ASICs 220 on the exterior side, for thermal transfer toward the base structure 124 and to optimize the usage of the interior 124I, allowing pot cored or other magnetic components mounted inside the cylinder. In the example of FIGS. 9-11, for instance, a pot cored component 500 may be a cylindrical shape itself, and is located within the cylinder/partial cylinder flex board 200f. As shown in the top view of FIG. 10, the flex board 200f may extend to form a substantially complete cylinder. Alternatively, the flex board may extend through an angle θ of less than 360 degrees. In certain embodiments, as shown in FIG. 11, the flex board 200f is formed in a partial cylindrical shape with the outer surface of the flex board 200f proximate the inner surface of the first portion 124a of the base structure 124 through an angle θ that is less than 360 degrees and more than 180 degrees. As further shown in FIG. 9, the ballast/driver board assembly 200 may include flex board(s) 200f as well as non-flex boards 200.

Figure 12:
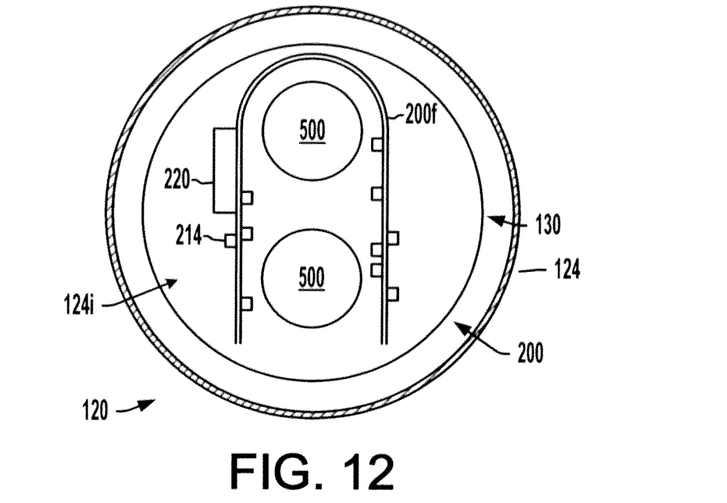
FIG. 12 is a partial top plan view in section taken along line 11-11 in FIG. 9 showing another embodiment with a U-shaped flex board extending at least partially near the inner wall of the Edison base.
Figure 13:
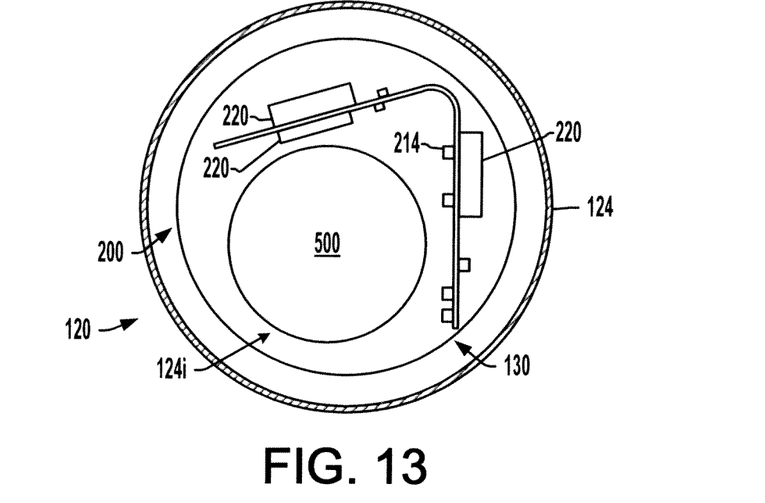
FIG. 13 is a partial top plan view in section taken along line 11-11 in FIG. 9 showing another embodiment with a V-shaped flex board extending at least partially near the inner wall of the Edison base.

Referring also to FIGS. 12 and 13, various single or multiple-flex board architectures can be used, in which a flex board 200f is shaped to include one or more planar (flat or straight) portions and/or one or more curvilinear portions. Such flex board(s) can be populated with SMT components 214 and/or ASICs 220 on one or both sides, and can be combined with rigid boards 200, mirror structures 300, potting materials 400, and/or one or more pot-cored components 500.

FIG. 12 illustrates another embodiment in which a generally U-shaped flex board 200f extends at least partially near the inner surface of the first portion 124a of the base structure 124, with two pot-core components 500 disposed between flat portions of the board 200f; where the board 200f includes components 214 on both inner and outer sides and an ASIC 220 on one outer side (in a flat portion) of the U-shape.

Yet another embodiment is shown in FIG. 13 using a V-shaped flex board 200f with a bend portion extending near the inner surface or inner wall of the first portion 1214a in an Edison base, where each of two flat portions include components 214 and ASICs 220.

Figure 14:
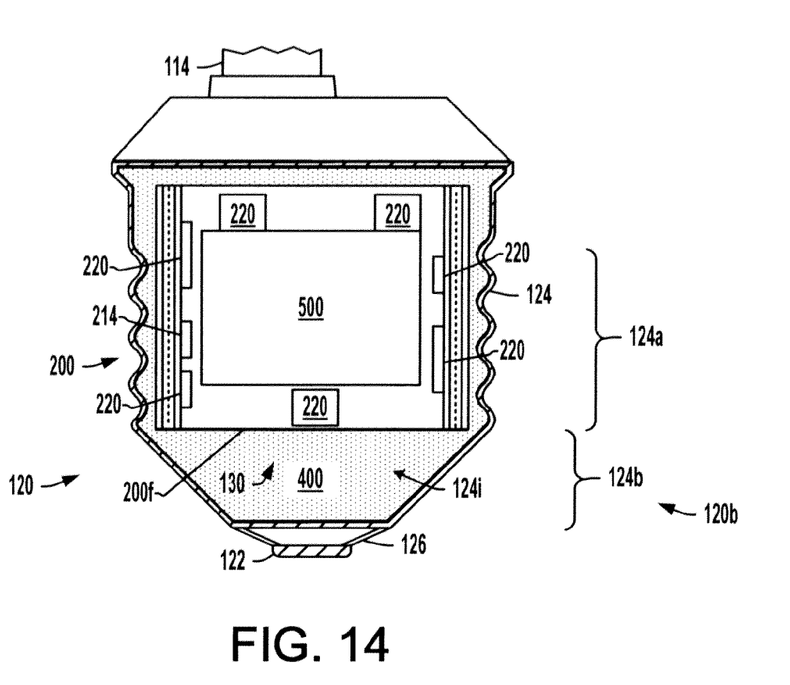
FIG. 14 is partial side elevation view in section illustrating an exemplary light source including a cylindrical flex board with a pot core magnetic component and potting material in the Edison base interior.

FIG. 14 shows another example in which a cylindrical flex board 200f is used with a pot core magnetic component 500 in the center and potting material 400 substantially filling the Edison base interior 124i.

Figure 15:
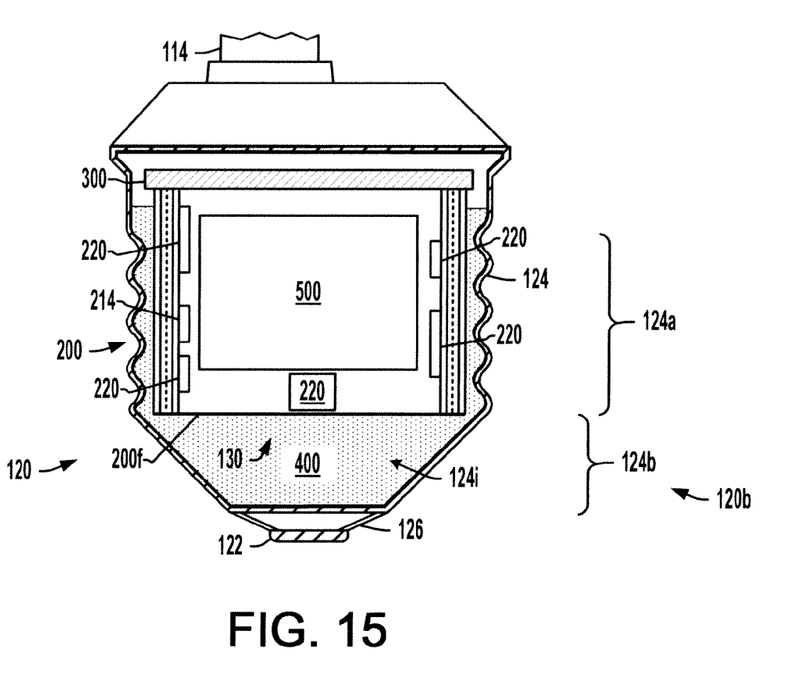
FIG. 15 is partial side elevation view in section illustrating an exemplary light source including a cylindrical flex board with a pot core magnetic component, potting material, and an upwardly facing mirror in the interior of an Edison base.

Yet another exemplary embodiment is shown in FIG. 15, in which a cylindrical flex board 200f is provided with a centrally located pot core magnetic component 500, along with partially filling potting material 400 and an upwardly facing mirror 300 in the interior 124i of the Edison base 120.

The disclosure thus provides solutions to the challenge of packaging of electronics in the Edison base 120, and can be advantageously employed in low wattage devices, for example light sources rated for about 30 watts or less. The techniques can be employed to facilitate electronic component cooling through optimized use of circuit board volume through thermal vias and conductive core layers 210, as well as by directly embedding devices into the circuit board laminate. In addition, the mirror techniques 300 can reduce the impact of the hot light source 114, 602 on the electronics by incorporating a hot mirror reflector directly on the unpopulated surface of the PCBA (SMT devices are embedded). The disclosure also provides advantages for mounting components in an Edison screw base for very high wattage lighting products, where the integrated combination of two or more of these techniques facilitate heat transfer out through the Edison base itself.

The above examples are merely illustrative of several possible embodiments of various aspects of the present disclosure, wherein equivalent alterations and/or modifications will occur to others skilled in the art upon reading and understanding this specification and the annexed drawings. In particular regard to the various functions performed by the above described components (assemblies, devices, systems, circuits, and the like), the terms (including a reference to a "means") used to describe such components are intended to correspond, unless otherwise indicated, to any component, such as hardware, processor-executed software, or combinations thereof, which performs the specified function of the described component (i.e., that is functionally equivalent), even though not structurally equivalent to the disclosed structure which performs the function in the illustrated implementations of the disclosure. In addition, although a particular feature of the disclosure may have been illustrated and/or described with respect to only one of several implementations, such feature may be combined with one or more other features of the other implementations as may be desired and advantageous for any given or particular application. Furthermore, references to singular components or items are intended, unless otherwise specified, to encompass two or more such components or items. Also, to the extent that the terms "including", "includes", "having", "has", "with", or variants thereof are used in the detailed description and/or in the claims, such terms are intended to be inclusive in a manner similar to the term "comprising". The invention has been described with reference to the preferred embodiments. Obviously, modifications and alterations will occur to others upon reading and understanding the preceding detailed description. It is intended that the invention be construed as including all such modifications and alterations.

The following is claimed:

1. A light source, comprising:
   at least one light emitting element; and
   a base assembly comprising:
      a base structure having an interior, a generally cylindrical first portion, and first and second electrically conductive contacts, and
      a ballast or driver operative to selectively convert power received from a threaded socket to provide power to the at least one light emitting element, the ballast or driver comprising a circuit board assembly located at least partially within the interior of the base structure, the circuit board assembly comprising multiple layers and including at least one embedded electrical component formed between adjacent layers of the circuit board assembly, where the ballast or driver includes at least one pot core magnetic component located at least partially within the interior of the base structure.

2. The light source of claim 1, where the circuit board assembly is round and includes a circular outer surface proximate an inner surface of the first portion of the base structure.

3. The light source of claim 2, where the base assembly comprises potting material formed around at least a portion of the circuit board assembly in the interior of the base structure.

4. The light source of claim 2, further comprising a mirror mounted directly on an unpopulated surface of an upper layer of the circuit board assembly between the at least one light emitting element and the ballast or driver, the mirror including a reflective surface at least partially facing toward the at least one light emitting element.

5. The light source of claim 2, where the circuit board assembly includes a thermally conductive core layer formed between an upper adjacent layer and a lower adjacent layer and operative to conduct heat toward the inner surface of the first portion of the base structure.

6. The light source of claim 5, where the circuit board assembly includes at least one thermal via structure extending through at least one of the layers to the core layer to conduct heat toward the core layer.

7. The light source of claim 6, where the base assembly comprises potting material formed around at least a portion of the circuit board assembly in the interior of the base structure.

8. The light source of claim 2, comprising at least one application specific integrated circuit (ASIC) mounted to an outer layer of the circuit board assembly.

9. The light source of claim 1, where the circuit board assembly is located completely within the interior of the base structure.

10. The light source of claim 1, where the base assembly comprises potting material formed around at least a portion of the circuit board assembly in the interior of the base structure.

11. The light source of claim 1, further comprising a mirror mounted directly on an unpopulated surface of an upper layer of the circuit board assembly between the at least one light emitting element and the ballast or driver, the mirror including a reflective surface at least partially facing toward the at least one light emitting element.

12. The light source of claim 1, where the circuit board assembly includes a thermally conductive core layer formed between an upper adjacent layer and a lower adjacent layer and operative to conduct heat toward the inner surface of the first portion of the base structure.

13. A light source, comprising:
    at least one light emitting element; and
    a base assembly comprising:
       a base structure having an interior, a generally cylindrical first portion, and first and second electrically conductive contacts, and
       a ballast or driver operative to selectively convert power received from a threaded socket to provide power to the at least one light emitting element, the ballast or driver comprising a circuit board assembly located at least partially within the interior of the base structure, the circuit board assembly comprising multiple layers and including at least one embedded electrical component formed between adjacent layers of the circuit board assembly;
    where the circuit board assembly includes a thermally conductive core layer formed between an upper adjacent layer and a lower adjacent layer and operative to conduct heat toward the inner surface of the first portion of the base structure; and
    where the circuit board assembly includes at least one thermal via structure extending through at least one of the layers to the core layer to conduct heat toward the core layer.

14. The light source of claim 1, comprising at least one active application specific integrated circuit (ASIC) mounted to an outer layer of the circuit board assembly.

15. The light source of claim 1, comprising at least one passive application specific integrated circuit (ASIC) mounted to an outer layer of the circuit board assembly.

16. The light source of claim 1, where the ballast or driver includes a flex board with an outer surface at least partially proximate an inner surface of the first portion of the base structure.

17. The light source of claim 16, where the flex board is formed in a partial cylindrical shape with the outer surface of the flex board proximate the inner surface of the first portion of the base structure through an angle that is less than 360 degrees and more than 180 degrees.

18. The light source of claim 16, where the flex board is formed in a U-shape.

19. The light source of claim 16, where the flex board is formed in a V-shape.

20. The light source of claim 1, where the at least one light emitting element is an LED.

21. The light source of claim 1, where the at least one light emitting element is a fluorescent lamp, a halogen lamp, or a high intensity discharge (HID) lamp.

22. The light source of claim 1, where the at least one embedded electrical component is an embedded resistor.

23. The light source of claim 1, where the at least one embedded electrical component is an embedded capacitor.

24. The light source of claim 1, where the at least one embedded electrical component is an embedded inductor.

25. The light source of claim 1, where the base assembly is an Edison base assembly, and where the generally cylindrical first portion of the base structure comprises a threaded outer surface forming the first electrically conductive contact to engage a threaded socket, and where the second electrically conductive contact is separated from the first electrically conductive contact by an electrically insulative structure.

26. A light source, comprising:
    at least one light emitting element; and
    a base assembly comprising:
       a base structure having an interior, a generally cylindrical first portion, and first and second electrically conductive contacts, and a ballast or driver operative to selectively convert power received from a threaded socket to provide power to the at least one light emitting element, the ballast or driver comprising a circuit board assembly located at least partially within the interior of the base structure, the circuit board assembly comprising a flex board with an outer surface proximate an inner surface of the first portion of the base structure, where the ballast or driver includes at least one pot core magnetic component located at least partially within the interior of the base structure.

27. The light source of claim 26, where the flex board is formed in a partial cylindrical shape with the outer surface of the flex board proximate the inner surface of the first portion of the base structure through an angle that is less than 360 degrees and more than 180 degrees.

28. The light source of claim 26, where the flex board is located completely within the interior of the base structure.

29. The light source of claim 26, where the flex board is formed in a U-shape.

30. The light source of claim 26, where the flex board is formed in a V-shape.

31. The light source of claim 26, where the base assembly comprises potting material formed around at least a portion of the flex board in the interior of the base structure.

32. The light source of claim 26, further comprising a mirror mounted directly on an unpopulated surface of an upper layer of the circuit board assembly between the at least one light emitting element and the ballast or driver, the mirror including a reflective surface at least partially facing toward the at least one light emitting element.

33. The light source of claim 26, where the at least one light emitting element is an LED.

34. The light source of claim 26, where the at least one light emitting element is a fluorescent lamp, a halogen lamp, or a high intensity discharge (HID) lamp.

35. The light source of claim 26, where the base assembly is an Edison base assembly, and where the generally cylindrical first portion of the base structure comprises a threaded outer surface forming the first electrically conductive contact to engage a threaded socket, and where the second electrically conductive contact is separated from the first electrically conductive contact by an electrically insulative structure.

36. The light source of claim 1, where the at least one pot core magnetic component is situated above the circuit board assembly between the at least one lighting element and the circuit board assembly.

37. The light source of claim 1, where the at least one pot core magnetic component is situated below the circuit board assembly between the first and second electrical contacts of the base structure and the circuit board assembly.

38. The light source of claim 1, where the at least one pot core magnetic component is mounted to an outer layer of the circuit board assembly.

39. The light source of claim 13, where the thermally conductive core layer is FR4 and conducts heat from the at least one thermal via structure laterally outward toward an inner surface of the first portion of the base structure.

* * * * *